Patented Feb. 6, 1951

2,540,984

UNITED STATES PATENT OFFICE 2,540,984

COPOLYMERS OF VINYL PYRIDINE AND POLYVINYL AROMATIC COMPOUNDS

Elwood F. Jackson, Ludlow, Mass., assignor to Monsanto Chemical Company, St. Louis, Mo., a corporation of Delaware No Drawing. Application October 19, 1948, Serial No. 55,425

7 Claims. (Cl. 260—88.1)

This invention relates to ion exchange resins. More particularly, the invention relates to ion exchange resins derived from copolymers of polyvinyl derivatives of aromatic compounds and monovinyl derivatives of heterocyclic compounds containing nitrogen.

The use of resinous compositions as anion exchange or acid-absorbing media has become increasingly important, especially in the purification of foodstuffs such as sugar syrups. To be economically useful, such resins must meet many critical requirements.

In the first place, the resins must be colorless or must contain no color which can be leached out by the solutions under treatment. For instance, any color leaching out into cane sugar solutions would be particularly undesirable.

Furthermore, the resins must not only be insoluble in water, acids and alkalies, but they must not swell or soften excessively in contact with such materials. Water-solubility would lead to continual losses of resin and contamination of the material being treated. Swelling and softening of the resins would lead to coalescence of the resin particles and subsequent blocking of the filter beds.

The resins must not be toxic and cannot have toxic materials associated with them which might be leached out by the materials being purified, especially if those materials are foodstuffs.

The resins must have a high capacity for absorption of acids and the operating pH should be high enough to remove all acidic materials, since a relatively low operating pH restricts the use of the resin.

After the absorbing capacity of the resins has been exhausted, it must be possible to easily, efficiently and economically regenerate the resin for reuse.

The known acid-absorbing resins fail to meet one or more of these exacting requirements.

An object of this invention is to provide new vinyl copolymers.

A further object is to provide vinyl copolymers that are efficient anion absorbing resins.

Another object is to provide anion absorbing resins which have high acid absorptive properties and which may be easily and simply regenerated.

These and other objects are attained by copolymerizing a polyvinyl derivative of an aromatic compound with a monovinyl derivative of a nitrogen-containing heterocyclic compound.

The following examples are given in illustration and are not intended as limitations on the scope of this invention. Where parts are mentioned, they are parts by weight.

Example I

A mixture of 100 parts of 2-vinyl pyridine with 5 parts of divinyl benzene and 0.2 part of lauroyl peroxide was polymerized in a sealed tube for about 15 hours at 120° C. The product was a hard, tough, reddish resin which was insoluble and infusible, and which did not swell excessively in water.

Example II

A mixture of 100 parts of 2-vinyl pyridine with 30 parts of a solution of divinyl benzene in ethyl benzene, said solution containing 16% by weight of divinyl benzene, and 0.2 part of lauroyl peroxide was polymerized in a sealed tube for 15 hours at about 120° C. The resultant polymer was tough and elastic and slightly reddish in color. The polymer was heated under vacuum at 105° C. to drive off residual solvent. The polymer thus obtained was tough and quite hard. When pulverized and treated with dilute hydrochloric acid, the resin turned to a light yellow color, but did not dissolve.

Example III

A mixture of 100 parts of 2-vinyl pyridine with 70 parts of a 16% by weight solution of divinyl benzene in ethyl benzene and 0.05 part of lauroyl peroxide was heated at about 130° C. for about 15 hours to yield a tough, elastic, reddish polymer. The polymer was more resistant to crushing than those obtained in Examples I and II.

Example IV

A solution was prepared by adding 0.5 part of the sodium salt of mahogany acids to 200 parts of water containing about 0.1 part of potassium persulfate. To the solution, a monomer mixture containing 95 parts of 2-vinyl pyridine, 5 parts of divinyl benzene and 0.5 part of the sodium salt of mahogany acids, was added dropwise over a period of about one hour while maintaining the reaction mixture at reflux temperature and atmospheric pressure with constant agitation. 0.2 part of potassium persulfate was added in small increments during the addition of the monomer mixture to the water. After all additions had been made, the reaction mixture was maintained at reflux temperature and atmospheric pressure with constant agitation for about 15 minutes. The product was a copolymer of 2-vinyl pyridine and divinyl benzene emulsified in water. The emulsion was dried on open trays at about 110° C. for about 72 hours to provide a light brown, hard and tough polymer.

*Example V*

To 33 parts of a 34% solution of divinyl benzene in ethyl benzene, were added 100 parts of 2-vinyl pyridine, 12 parts of bentonite, 12 parts of lauroyl peroxide, and 440 parts of distilled water. The mixture was agitated in a sealed container for about 16 hours at 50° C. The product was an aqueous suspension of beads of a copolymer of divinyl benzene with vinyl pyridine. The beads were removed by filtration and washed with water and hydrochloric acid. Although they appeared to be white in color, examination under a microscope disclosed that the beads were actually clear and colorless. The beads were substantially unchanged after 16 hours exposure to a temperature of about 105° C.

*Example VI*

A mixture of 100 parts of 2-vinyl pyridine with 11 parts of 1,3,5-trivinyl benzene and 0.11 part of lauroyl peroxide was polymerized in a sealed tube at about 80° C. for 15 hours. The product was a hard, glassy copolymer, slightly yellow in color.

*Example VII*

A mixture comprising 100 parts of 2-vinyl pyridine, 11 parts of 1,3,5-trivinyl benzene, 1 part of lauroyl peroxide, 1 part of bentonite, and 440 parts of water was subjected to constant agitation at about 50° C. for 15 hours. The product was a suspension of a substantially colorless copolymer of vinyl pyridine and trivinyl benzene. The copolymer was in the form of hard, spherical beads. They were insoluble in acids and alkalies.

The resins of this invention are copolymers of polyvinyl derivatives of aromatic compounds and the ring-substitution products thereof with monovinyl derivatives of nitrogen-containing heterocyclic compounds.

Among the polyvinyl derivatives of aromatic compounds which may be used, are divinyl benzene, trivinyl benzene, tetravinyl benzene, etc., divinyl naphthalene, trivinyl naphthalene, tetravinyl naphthalene, divinyl and polyvinyl diphenyls, divinyl and polyvinyl anthracenes, and the ring-substituted derivatives thereof in which the substituting group may be alkyl such as methyl, ethyl, propyl, isopropyl, butyl, isobutyl, octyl, etc.; aryl such as phenyl or naphthyl; aralkyl such as benzyl; amino; nitro; halogens such as chlorine, fluorine, bromine or iodine; etc. It is understood, of course, that the number and type of such substituents must not be such that they prevent the polyvinyl compound from copolymerizing.

Among the monovinyl derivatives of nitrogen-containing heterocyclic compounds which may be used are vinyl pyridine, vinyl quinoline, vinyl pyrrole, vinyl pyrrolidine, vinyl pyrrolidone, vinyl pyrroline, vinyl indole, and the ring-substituted derivatives thereof in which the substituted group may be alkyl such as methyl, ethyl, propyl, isopropyl, butyl, isobutyl, octyl, etc.; aryl, such as phenyl and naphthyl; aralkyl, such as benzyl; amino; nitro; halogen, such as chlorine, bromine, iodine, fluorine; etc. The nature and number of the substituents will alter the nature of the resin produced so that resins may be obtained ranging from soft, elastic, and tough materials to hard, rigid, and brittle materials.

The ratio of the polyvinyl monomer to the monovinyl monomer may be varied from about 1-20 parts of the polyvinyl compounds to 100 parts of monovinyl derivative. In this range, the copolymers containing the smaller amount of a particular polyvinyl derivative are softer, more elastic and more easily swollen by water and dilute acids and alkalies. However, trivinyl monomers will give harder products than divinyl monomers at the same concentration. All of the copolymers are insoluble and infusible.

If desired, one or more additional polymerizable materials may be copolymerized with the polyvinyl and monovinyl derivatives of this invention. Among such polymerizable compounds are the vinylidene compounds which include vinyl compounds, acrylic compounds, allyl compounds, and the alpha, beta-unsaturated polycarboxylic acids and their derivatives. Among the vinyl compounds which may be used are the vinyl esters of organic acids such as vinyl acetate, vinyl propionate, vinyl butyrate, vinyl isobutyrate, vinyl valerate, vinyl laurate, vinyl stearate, vinyl benzoate, vinyl cinnamate, vinyl crotonate, etc.; vinyl ethers, such as vinyl methyl ether, vinyl isobutyl ether, vinyl phenyl ether, etc.; vinyl ketones such as methyl vinyl ketone, ethyl vinyl ketone; phenyl vinyl ketone, etc.; vinyl aryl derivatives such as styrene, ortho methyl styrene, para methyl styrene, para ethyl styrene, 2,4-dimethyl styrene, alpha methyl para methyl styrene, alpha methyl styrene and other alkyl derivatives of styrene in which the alkyl group or groups may be substituted in the ring, on the side chain, or both, vinyl naphthalene, vinyl diphenyl, etc.; vinyl halides such as vinyl chloride, vinyl fluoride, etc.; vinylidene halides such as vinylidene chloride, vinylidene fluorochloride, etc. Among the acrylic acids and alpha-substituted acrylic acids and their derivatives such as their esters, nitriles, amides, etc., which may be used are acrylic acid, methacrylic acid, ethacrylic acid, alpha-phenyl acrylic acid; the methyl, ethyl, propyl, isopropyl, butyl, isobutyl, amyl, octyl, dodecyl, etc., esters thereof; acrylamide; methacrylamide; acrylonitrile; methacrylonitrile; ethacrylonitrile; etc. Allyl esters, ethers, and ketones corresponding to the vinyl compounds listed above may be used. Among the alpha, beta-unsaturated polycarboxylic acids and their derivatives which may be used are maleic, fumaric, citraconic, itaconic, mesaconic, crotonic, aconitic, tricarballylic acids and their mono and polyesters with aliphatic and aromatic alcohols, their amides and nitriles. The amount of additional monomer should be restricted to form 1 to 25 parts per 100 parts of the copolymers of this invention.

The preferred copolymers of this invention are the copolymers of 2-vinyl pyridine with either divinyl benzene or trivinyl benzene since each of these monomeric materials is readily available at comparatively low cost. Trivinyl benzene is particularly preferred since it may be obtained free from impurities or solvents and may be used in smaller quantities than the divinyl benzene to obtain harder resins.

The copolymers of this invention may be made by mass, solution, suspension or emulsion polymerization using standard methods known to the art as disclosed, in part, in the examples. They are insoluble and infusible resins, some of which contain a slight amount of red or yellow coloring which appears to be due to the internal structure of the resin, since it cannot be leached out, although many of the copolymers are substantially colorless. They range from soft, elastic materials to hard, rigid materials and are insoluble in water, alkalies and acids. They are definitely basic in character and are especially useful as ion exchange resins. If vinyl pyridine is used, the resins have fungicidal properties which are important in treating cane sugar syrups where the rapid growth of fungi is a perennial problem.

The copolymerization reaction may be catalyzed by such materials as heat, light, oxygen, peroxides such as benzoyl peroxide, lauroyl peroxide, di(tertiary alkyl) peroxides, tertiary alkyl hydroperoxides, persalts such as potassium persulfate, ammonium persulfate, perborates, etc. The amount of catalyst to be used may vary from about 0.01 to about 5 parts per 100 parts of total monomer.

If the emulsion polymerization technic is to be used, various emulsifying agents may be employed such as soaps, sodium salts of organic sulfonic acids such as sodium alkyl naphthalene sulfonates, sodium salts of dialkyl sulfosuccinic acid esters such as the sodium salt of dioctyl succinate, sodium lauryl sulfonate, sodium disulfonate of dibutyl phenyl phenol, sodium salts of higher secondary synthetic alcohols, sodium salts of mahogany acids, etc. In place of the sodium salts, the ammonium, potassium, cesium, lithium, and rubidium salts may be used.

Various conventional additives, such as fillers, pigments, plasticizers, dyes, lubricants, etc., may be incorporated with the copolymers of this invention, the additions preferably taking place either at the start of the polymerization reaction or before the completion of said reaction.

The copolymers of this invention are particularly useful as ion exchange resins since they can be formulated so that they are extremely hard, substantially non-swelling in water, resistant to acids and alkalies and non-fusible. They have a relatively high absorptive capacity for anions as shown by the static evaluation test. In addition, the resins contain no leachable color or toxic ingredients and are easily regenerated by treatment with alkalies, ammonia, or quaternary ammonium hydroxides.

*Example VIII*

100 parts of the hard, reddish resin made according to Example II were pulverized and washed with dilute hydrochloric acid, resulting in a light yellow-colored resin. The resin, after regeneration with NaOH, was slurried with excess standardized hydrochloric acid and the slurry was agitated for about six hours at room temperature. The excess acid was then titrated with sodium hydroxide to find the absorption capacity of the resin. The absorption capacity was found to be 37 kilo grains per cubic foot, calculated as calcium carbonate. The resin could then be easily and quickly regenerated with ammonia or other alkalies. It did not swell excessively in the absorption test and no color was leached therefrom. Furthermore, there was no toxic residue in the resin which could be transmitted to the solutions to be treated.

The static evaluation test described in Example VIII is a standard test used to evaluate the acid-absorbing powers of anion exchange resins. It consists of slurrying the resin with an excess of acid, preferably hydrochloric acid, agitating the slurry for six hours at room temperature, and then determining the amount of acid absorbed by back-titrating the excess acid not absorbed by the resin. The results are described in terms of kilo grains of calcium carbonate absorbed per cubic foot of resin.

The resins made according to Examples I and III–VII were all tested in the static evaluation test and were found to have substantially the same anion absorbing properties as the resin of Example II. They could all be easily and quickly regenerated with aqueous alkali.

The copolymers of this invention may be reduced or hydrogenated to provide resins which are more basic in character. It is preferred to carry out the reduction with the aid of finely divided metals and a strong mineral acid. Since many of the copolymers are extremely hard and difficult to comminute to a fine powder, it is sometimes convenient to disperse the finely divided metal, such as finely divided nickel, in the monomers prior to the polymerization reaction. By this method, the reduction catalyst is intimately dispersed throughout the copolymer and insures a more complete hydrogenation of the resin.

*Example IX*

A copolymer was prepared by heating 360 parts of 2-vinyl pyridine with 116 parts of divinyl benzene solution containing 34 parts of divinyl benzene in the presence of 0.2 part of lauroyl peroxide at 128–130° C. for 42 hours. The resulting product was dried under vacuum and pulverized. 50 parts of the pulverized product were mixed with 276 parts of sodium and 440 parts of xylene. The mixture was heated under reflux for about ½ hour to exclude air, and then 1500 parts of methyl isobutyl carbonol were added slowly with constant agitation while maintaining the mixture at reflux temperature and atmospheric pressure. After all of the sodium was consumed, the reaction mixture was cooled, washed with methanol, and filtered to recover the resin. The resin was found to have much stronger basic properties than the unreduced resin, and even tended to remove sodium from solutions of sodium hydroxide if the proper precautions were not taken in regeneration of the resin.

The copolymer resins of this invention may also be used as casting resins to provide insoluble, infusible articles, and they may be used as molding resins if the polymerization reaction is stopped before it is complete and while the resin is still partially fusible. In this state, the resins may be molded under standard molding conditions of heat and pressure. The temperature of the molding operation is generally sufficient to complete the polymerization reaction so that the final product is insoluble and infusible.

It is obvious that many changes may be made in the products and processes of this invention without departing from the spirit and scope thereof as defined in the appended claims.

What is claimed is:

1. An anion exchange resin comprising a copolymer of 100 parts of a monovinyl substituted heterocyclic compound containing a nitrogen atom in the heterocyclic ring and from 1 to 20 parts of a polyvinyl aromatic compound containing from 2 to 4 vinyl groups.

2. An anion exchange resin as in claim 1 wherein the monovinyl compound is vinyl pyridine.

3. An anion exchange resin as in claim 2 wherein the polyvinyl compound is divinyl benzene.

4. An anion exchange resin as in claim 2 wherein the polyvinyl compound is trivinyl benzene.

5. an anion exhange resin comprising a hydrogenated copolymer of 100 parts of a monovinyl substituted heterocyclic compound containing a nitrogen atom in the heterocyclic ring and from 1 to 20 parts of a polyvinyl aromatic compound containing from 2 to 4 vinyl groups.

6. An anion exchange resin comprising a copolymer of about 90% vinyl pyridine and about 10% divinyl benzene.

7. An anion exchange resin comprising a copolymer of about 83⅓% to about 98% of a member of the group consisting of vinyl pyridine and vinyl quinoline and correspondingly about 16⅔% to about 2% of a member of the group consisting of divinyl benzene, divinyl naphthalene and divinyl diphenyl.

ELWOOD F. JACKSON.

REFERENCES CITED

The following references are of record in the file of this patent:

UNITED STATES PATENTS

| Number    | Name     | Date          |
|-----------|----------|---------------|
| 2,366,007 | D'Alelio | Dec. 26, 1944 |
| 2,366,008 | D'Alelio | Dec. 26, 1944 |
| 2,469,295 | Meier    | May 3, 1949   |

OTHER REFERENCES

Walling et al., J. A. C. S., vol. 70, pp. 1543–1544 (Apr. 1948).